April 23, 1929.  R. E. CALLER  1,710,145
CONDUIT FOR DUST COLLECTING SYSTEMS
Filed May 28, 1927
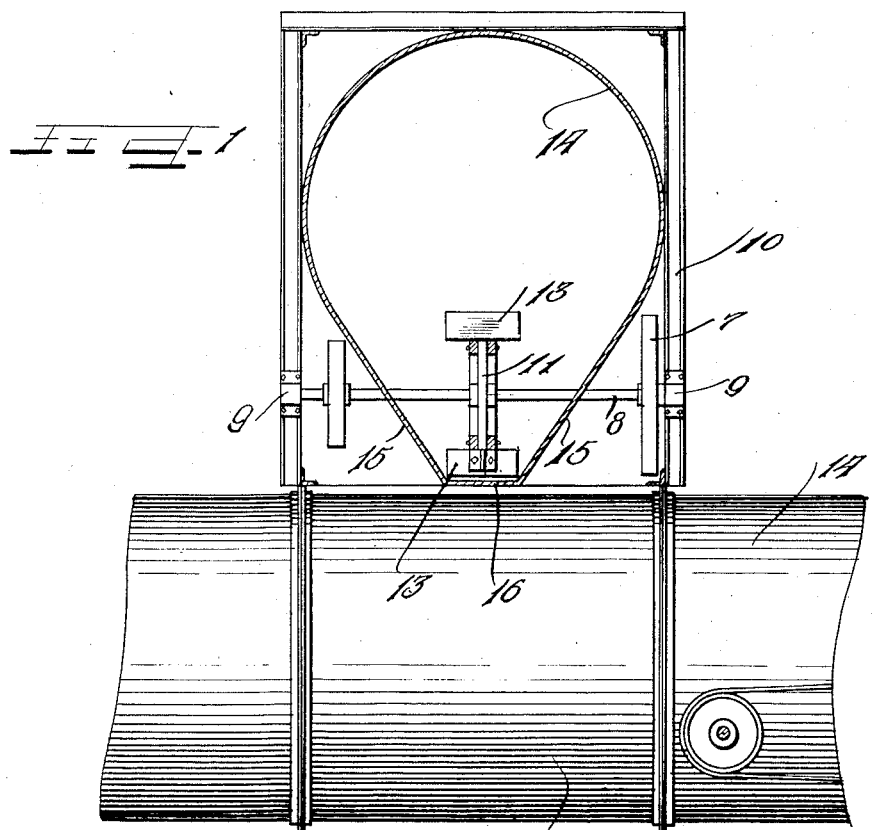
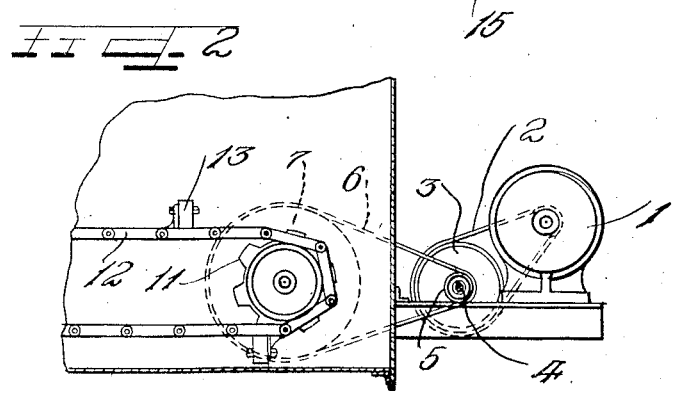
INVENTOR
Raymond E. Caller
BY Charles W. Hills
ATTYS Patented Apr. 23, 1929.

1,710,145

UNITED STATES PATENT OFFICE.

RAYMOND E. CALLER, OF NEW YORK, N. Y.

CONDUIT FOR DUST-COLLECTING SYSTEMS.

Application filed May 28, 1927. Serial No. 195,027.

This invention relates to dust collecting systems of the character shown in my Patent No. 1,610,358 dated Dec. 14, 1926 and pertains more particularly to a conduit or main trunk of a dust collecting system wherein the main trunks are equipped with high air velocity producing means and with means for conducting along the bottom of said trunk, miscellaneous materials, including dust, which are byproducts usually obtained in wood working establishments and the like.

It is an object of this invention to provide a dust collecting system with improved main conduits or trunk lines having a predetermined or selected cross section adapted to permit the material to lodge on the bottom where means are provided to coact therewith in the feeding of material through said trunk lines to produce a highly efficient system.

It is also an object of this invention to provide main pipes or trunk lines for a dust collecting system, with said trunk lines of a cross section, the upper portion of which is substantially round, while the lower portion is tapered and terminates in a flat bottom.

It is an important object of this invention to provide a main conduit or trunk line for a dust collecting system with a cross section adapted to facilitate the feeding of materials therethrough by any suitable means desired.

Other and further important objects of this invention will be apparent from the disclosures in the specification and the accompanying drawings.

This invention (in a preferred form) is illustrated in the drawings and hereinafter more fully described.

On the drawings:

Figure 1 is a transverse sectional view of a dust collecting pipe system using conduits or pipes embodying the principles of this invention.

Figure 2 is a fragmentary sectional view of a part of the conveyer driving mechanism associated with one of the conduits.

As shown on the drawings:

The improved dust handling or conveying system of this invention comprehends and includes the use of air conveyance of miscellaneous materials and dust through main conduits or trunk lines of a selected form. The system in which the improved conduits or trunk lines of this invention are used is described in detail in the earlier patent hereinbefore referred to. The parts of the dust collecting system illustrated in the drawings briefly comprise a driving motor 1 connected by means of an endless belt 2 to a large pulley 3 supported on a shaft 4. Also mounted on the shaft 4 is a small pulley 5 which in turn drives a belt 6 which is trained around a large pulley 7 supported on a shaft 8. The shaft 8 is journalled in suitable bearings 9 mounted on a framework 10. The shaft 8 projects transversely through the lower portion of the pipe system and carries a sprocket 11 around which an endless chain 12 is engaged. The chain carries a plurality of spaced drags or paddles 13. The endless chain has the other end thereof engaged around a suitable sprocket supported within the pipe system.

The improved dust collecting system is equipped with improved main pipes, conduits or trunk lines of a selected configuration. The main conduits or trunk lines constituting the present invention are of a predetermined cross section comprising a substantially round upper section 14, the lower ends of which integrally connect up with substantially straight inclined lower side walls 15 which converge and have the ends thereof integrally connected with a flat bottom 16. The improved conduits or trunk lines may be constructed of any desired material and with a peculiar cross section described so that the conveying means, if mechanical, may have the lower laps thereof positioned to run parallel with the bottom of the conduits, with the conveyer drags 13 spaced a short distance therefrom so that when the driving mechanisms operate the endless conveyers, the material within the conduits may be fed therethrough out of the tapered groove or pocket formed in the lower portions of the conduits. The sloping walls of the conduits serve to permit the heavier materials delivered thereto to be collected in the bottom of the conduits to be carried along by the conveying means while the lighter materials, such as dust, etc., remaining in the upper portions of the conduits may be carried therethrough by rapidly moving air currents produced in the system by blower mechanisms or other suitable devices as disclosed in the earlier patent referred to.

While a conveyer mechanism has been illustrated and described as one means for moving the material through the conduits or trunk lines, it will of course be understood that any other suitable means may be used for advancing the materials through the conduits over the flat bottom.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a dust collecting system, of main conduits comprising a rounded upper portion terminating in straight converging walls connecting up with a flat bottom.

2. A dust collecting system conduit comprising a substantially smooth round upper section and an integrally tapered lower section having a flat bottom and straight side walls.

3. A dust collecting system conduit comprising a substantially smooth semi-circular upper section, a flat bottom and substantially straight converging side walls connecting the flat bottom with the rounded upper section.

4. A conduit comprising a rounded upper portion having converging straight side walls integral therewith and disposed tangentially thereto, and a flat, narrow bottom connecting said side walls within a short distance of the normal point of intersection of said side walls.

5. A conduit having a cross-section, comprising a plain, rounded upper portion constructed of a metal of a given thickness and strength to withstand external pressure, and a tapered straight sided flat bottomed lower portion integral with said upper portion for materially increasing the cross-sectional area without necessitating the increase of the thickness of the material.

In testimony whereof I have hereunto subscribed my name.

RAYMOND E. CALLER.